April 11, 1961 M. O. MOECKEL 2,979,243
RIVET REMOVAL DEVICE FOR AIRCRAFT BRAKES
Filed May 13, 1959 3 Sheets-Sheet 2

INVENTOR.
MAX O. MOECKEL
BY
ATTORNEYS

April 11, 1961    M. O. MOECKEL    2,979,243
RIVET REMOVAL DEVICE FOR AIRCRAFT BRAKES
Filed May 13, 1959    3 Sheets-Sheet 3
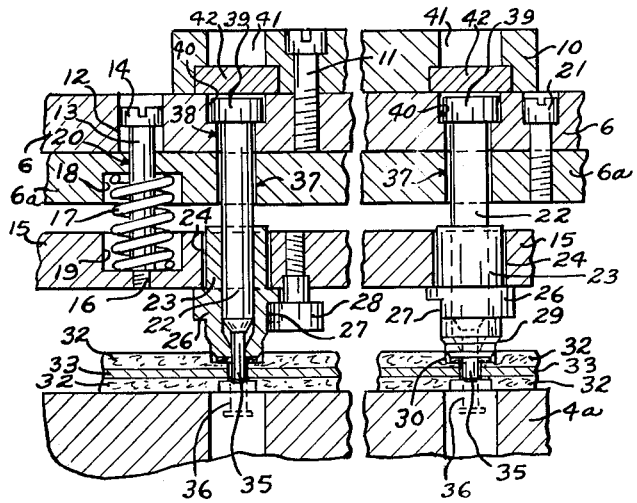
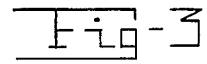
Fig-3
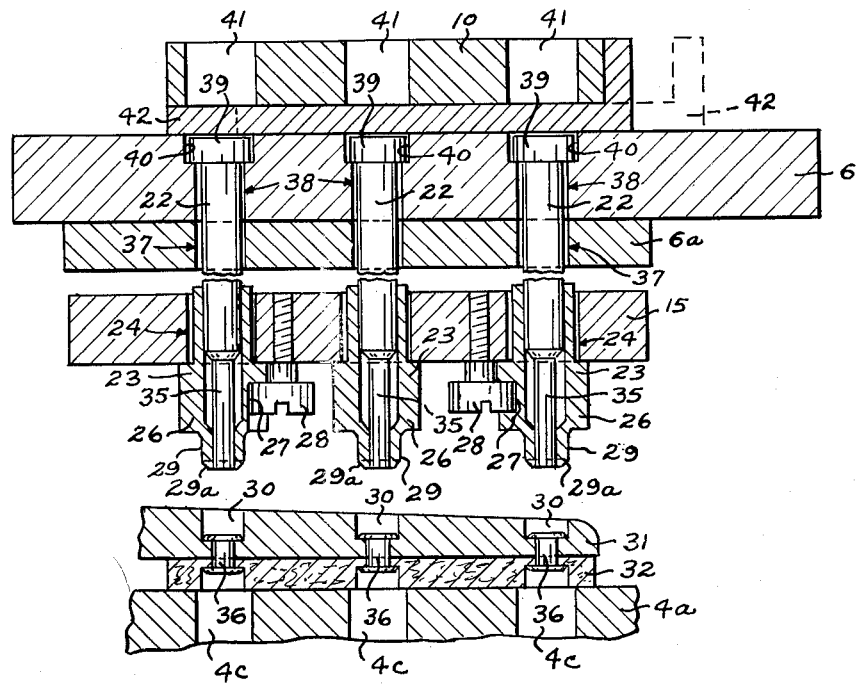
Fig-4
INVENTOR.
MAX O. MOECKEL
BY
ATTORNEYS

United States Patent Office 2,979,243
Patented Apr. 11, 1961

2,979,243
RIVET REMOVAL DEVICE FOR AIRCRAFT BRAKES

Max O. Moeckel, 5740 S. 2700 W., Roy, Utah

Filed May 13, 1959, Ser. No. 813,044

7 Claims. (Cl. 225—97)

(Granted under Title 35, U.S. Code (1952), sec. 266)

The invention described herein may be manufactured and used by or for the United States Government for governmental purposes without payment to me of any royalty therein.

This invention relates to punching devices and more particularly to a compact and accurate punching attachment for punching out rivets from disk brake linings without danger or likelihood of injury to the brake lining or the brake plate or disk during the rivet removing operation.

A further object is the provision of a rivet punching device for simultaneously punching out a plurality of rivets from a brake lining riveted to a disk type aircraft brake disk without danger or damage to the rivet holes when the holes and rivets are substantially, but not quite located, in a predetermined spaced relation in a group in the lining and disk.

A further object is the provision of a multi-punch rivet removing device for simultaneously removing a plurality of substantially predetermined spaced rivets securing brake linings of aircraft disk brakes to disk type brake plates or disks in which the rivet heads are located in recessed depressions, in which plural punch means are provided, each being mounted in shiftable guide bushing means arranged to shift laterally to enter the recessed depression to center all of the punches over the shanks of the rivets, and means for simultaneously and yieldably forcing the guide means into the recessed depressions in the brake disk lining, or the disk, to center the punches and positively and simultaneously force the punches so centered through the brake lining and brake plate to simultaneously punch out a plurality of the rivets of a group without damage to the brake plates or liners.

A further object includes means for mounting the brake disk plates and liners for rotation in predetermined radial relation to the plural guide means and means for indexing the mounting means to dispose a plurality of the rivets securing the brake linings to the brake disks in substantially predetermined punching alignment with the adjustable guide means and the rivet punches.

A further object includes stripping means for yieldably withdrawing the punch means, and the guide means therefor, out of engagement with the brake disks and brake liners after the rivets have been punched therefrom.

A further object includes a rivet punching device for punching out a group or plurality of rivets simultaneously from an aircraft brake disk having laterally and axially adjustable punch guide means each containing an axially movable rivet punch in which the device is in the form of an attachment adapted for use with standard punch presses and includes rotatably mounting means for the brake disks for indexing the rotative position of the brake disks to dispose predetermined groups of the brake lining rivets and rivet receiving openings in the brake disk substantially in axial alignment with the rivet punches during the punching operation.

A further object includes spring means for withdrawing the punch guide means and the rivet punches axially away from the brake disks and brake lining after the punches have been actuated to punch out the rivets.

A further object is the provision of a rivet-punching device having an upper die shoe having openings therethrough for insertion and removal of the rivet punches therethrough, and punch striker plate means removably mounted in said die shoe for closing said opening and engaging the upper ends of said punches to exert punching pressure on said punches during the punching operation, and including a punch retainer plate fixed to said die shoe and engaging the punches for simultaneously withdrawing the punches from the brake disks, in which the punches are disposed in the punch retainer plate for limited lateral adjustment relative to each other during the punching operation.

A further object includes a stripper plate mounted on the punch retainer plate parallel thereto for movement toward and away from the punch retainer plate, including stop means for limiting separation of the stripper plate away from the punch retainer plate and compression spring means between the punch retainer plate and the stripper plate yieldably urging the stripper plate away from the punch retainer plate into contact with the stop means, in which the stripper plate includes means for retaining the punch guide means in said stripper plate and providing relative lateral shifting adjustments between the punch guide means and the stripper plate during the punching operation.

A further object includes camming means on the outer ends of the punch guide means for engagement with the sides of the rivet receiving depressions in the brake disk, or the lining, as the case may be, during the plural punching operation to shift any of the punch guide means laterally in the stripper plate during the plural punching operation to dispose the central axis of the punch means in alignment with any of the brake lining rivets that may be slightly out of alignment with the centers of the rivets.

Other objects and advantages of the invention will become apparent from the following description and accompanying drawings in which like reference characters refer to like parts in the several figures.

Drawings

Figure 3 is a detailed vertical sectional view on an enlarged scale showing the punching device and lower die shoe with the punches projected through the heads of the rivets to punch out the rivets.

Figure 4 is a vertical sectional view taken in a plane substantially at right angles to Figure 3 and about on the plane indicated by line 4—4 in Figure 2, parts being broken away to foreshorten the view vertically.

Figure 1:
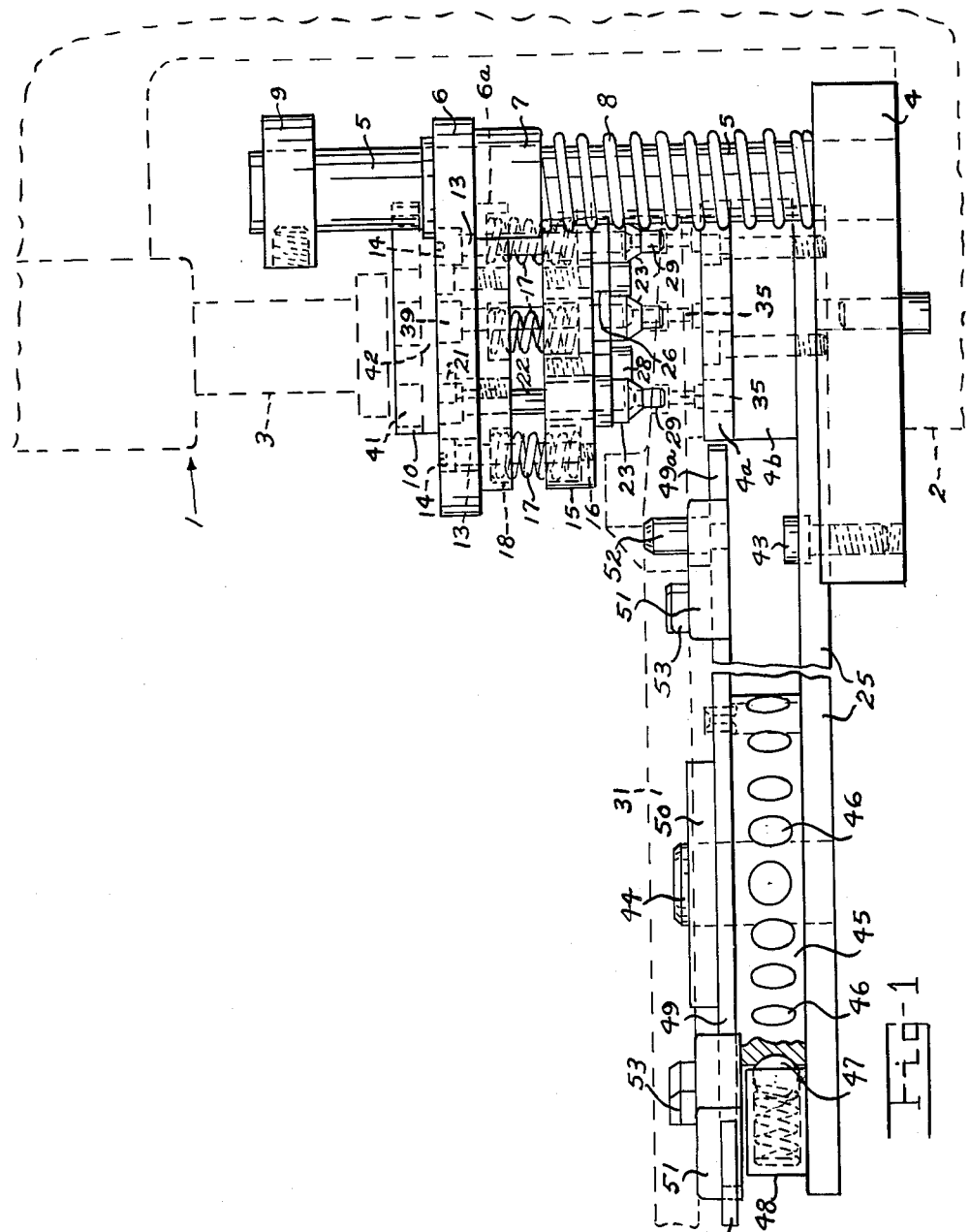
Figure 1 is a fragmentary side elevation of a portion of a punch press of any conventional type, having my improved rivet punching device or attachment mounted thereon, parts being broken away, shown in section and foreshortened for convenience, a portion of an aircraft brake disk being shown thereon in dotted lines.

In the drawings the reference numeral 1 denotes a portion of a conventional punch press having a base plate 2, and a punching head 3 movable axially or vertically in a conventional manner.

My improved rivet punch device comprises a lower pedestal or base 4 which is mountable on the base plate 2 in any suitable manner, either bolted to the base plate 2 or held down by suitable clamps (not shown).

The lower pedestal or base plate 4 carries spaced parallel guide standards or vertical guide rods 5 fixed therein, on which is slidably mounted, for vertical movement an upper punch retainer plate 6 hereafter also referred to as a top plate. This upper plate 6 is provided with vertical guide bushings 7 slidable on the guide rods 5.

Interposed between the pedestal plate 4 and the top plate 6 are compression coil springs 8 for yieldably exerting upward pressure on the top plate 6 to raise the top plate 6 when the punching head 3 of the press 1 is elevated. These springs normally hold the punches and guide bushings for the punches elevated above the brake plate and lining until depressed by downward pressure on the punching head 3, the springs 8 preferably surrounding the vertical guide rods or standards 5. A stop collar 9 is fixed on the upper end of each guide rod 5 to limit upward travel of the top plate 6 when downward pressure of the punching head 3 is removed.

Fixed to and directly above the top plate 6 is an upper die shoe or stripper plate 10. This upper die shoe or stripper plate 10 is secured to the top plate 6 by studs 11.

The upper die shoe 10 is formed with openings 12 therethrough for the heads of stripper bolts 13. The stripper bolts 13 have heads 14, with their shank portions passing through suitable guide openings in the punch guide plate 6ᵃ and the punch retainer top plate 6.

Spaced below the punch guide plate 6ᵃ is a stripper plate 15. The stripper bolts 13 have reduced threaded ends secured in suitable threaded openings 16 in the stripper plate 15.

As shown, there are four stripper bolts 13 in the stripper plate 15, each being surrounded by a compression, stripper coil spring 17 seated at its upper end in a spring seat 18 formed in the lower side of the punch guide plate 6ᵃ. The lower end of the spring 17 is seated in a similar spring seat 19 formed in the upper side of the stripper plate 15.

The springs 17 yieldably separate the stripper plate 15 from the punch guide plate 6ᵃ to a predetermined distance where the heads 14 of the stripper bolts 13 engage the upper surface of the punch guide plate 6ᵃ, thus limiting the separation. Upward movement of the stripper plate 15 relative to the punch guide plate 6ᵃ is permitted, the shanks of the stripper bolts 13 sliding in the guide opening 20 formed in the punch guide plate 6ᵃ and larger openings are provided for the heads 14 of the stripper bolts 13 in the punch retainer plate 6.

The punch guide plate 6ᵃ is secured to and directly below the punch retainer top plate 6 by bolts or studs 21 passing through openings in the top plate 6 and threaded into the punch guide plate 6ᵃ as seen in Figure 3.

The rivet punches are indicated at 22 and are slidably carried in punch guide bushings 23 which are disposed in oversize holes or apertures 24 extending through the stripper plate 15. The brake disk and liner support plate 4ᵃ is spaced from the pedestal block 4 by the spacer or filler block 4ᵇ and the elongated brake disk spider assembly supporting plate 25.

The guide bushings 23, as seen in Figure 3, loosely fit the holes 24 so as to permit limited radial adjustment of the guide bushings in any lateral direction and each bushing 23 is formed with a stop flange 26, bearing against the lower surface of the stripper plate 15, and is notched at 27 to receive the head of a bushing retainer screw 28, retaining the bushing 23 in its aperture 24 but permitting the lateral adjustment of the bushing just mentioned.

The lower ends 29 of the bushing 23 are reduced in diameter to the diameter of the rivet head openings 30 in the brake disk 31 (as seen in Figure 1) or in the brake lining 32 on the brake disk or plate 33 as seen in Figure 3. The lower ends 29 of the bushings 23 are beveled so as to be considerably smaller than the opening 30 so as to provide camming means for shifting any bushing laterally if misalignment thereof should occur due to any hole 30 being slightly out of a predetermined position in a predetermined group of aligned brake lining rivets. Reciprocatable within each of the bushings is one of the rivet punches 22 which has a reduced lower or punch end 35, the diameter of which is about the same, or slightly smaller than, the shank diameter of the rivets 36 securing the brake lining to the brake disk 31, or plate 33, as the case may be. The punch should be small enough to snugly pass through the rivet holes provided in the brake disk or plate for the shanks of the rivets.

The shanks of the punches 22 extend upwardly through guide passages in the bushings and pass through oversize openings 37 and 38 in the punch guide plate 6ᵃ and through the punch retainer or top plate 6 with the heads 39 socketed, as shown, in oversize recess openings 40 in the top plate 6 permitting lateral adjustment of any of the punches 22.

The die plate 10, located above the top plate 6 is provided with openings 41 extending vertically therethrough in alignment with the punches 22, the openings 41 being larger in diameter than the heads 39 of the punches so that the punches may removed or replaced through these openings. The lower side of the upper die shoe or plate 10 is channeled on its underside across the tops of the openings 40 and above the heads 39 of the rivet punches 22 to receive punch retainer striker plates 42 having upturned handle ends for easy removal.

When the upper die shoe 10 is forced downwardly by the punch press head 3 these punch retainer striker plates engage the heads of the punches 22 to force the punches downwardly to punch out the rivets 36.

Figure 2:
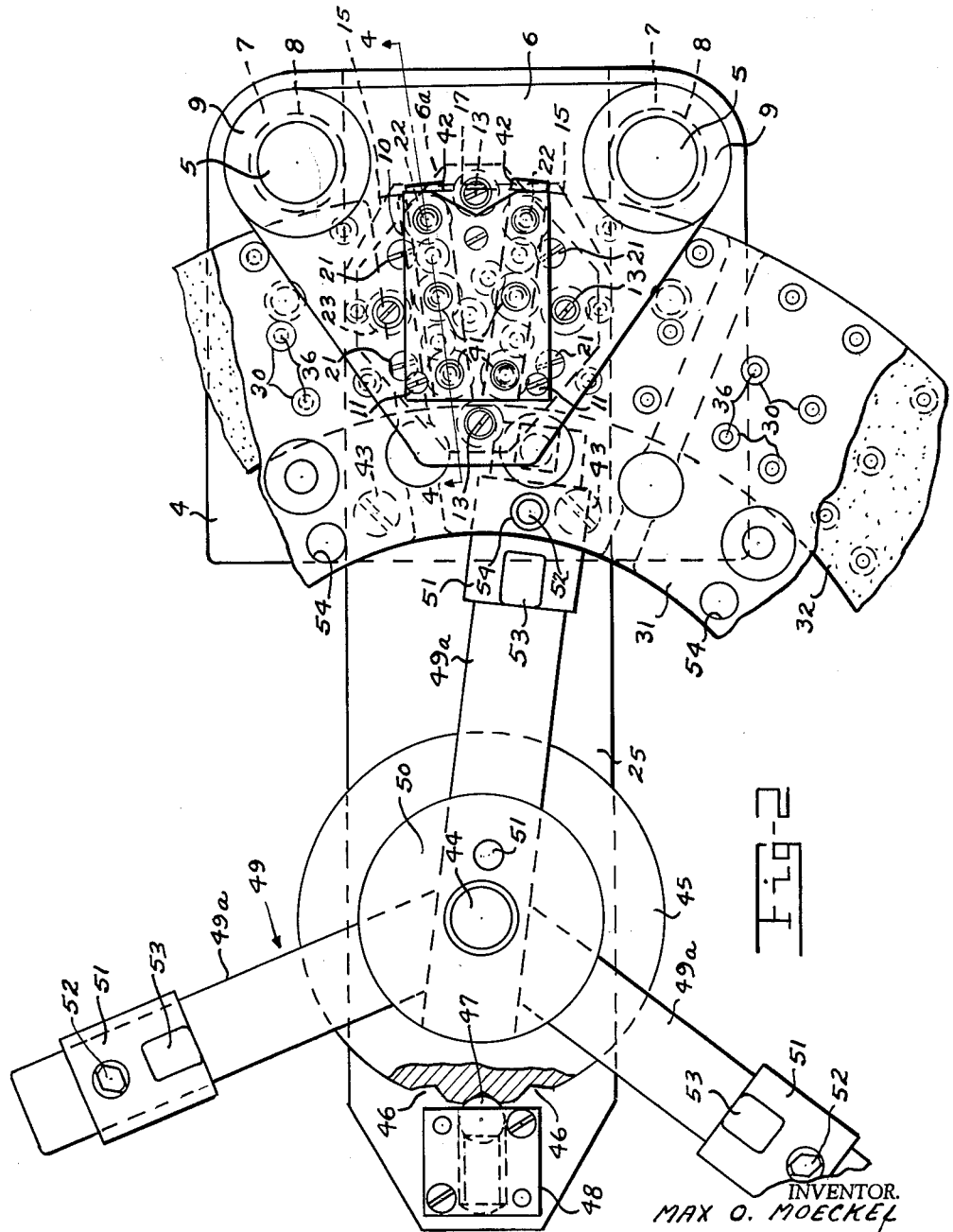
Figure 2 is a top plan view of the device as shown in Figure 1, parts being broken away and shown in section with the brake disk omitted.

Referring now to Figures 1 and 2 the brake disk spider assembly plate 25 is secured by bolts or studs 43 to the lower pedestal or base plate 4 and extends horizontally away from plate 4, and carries a pivot or vertical spindle 44 on which is journalled an index disk 45 having indexing depressions 46 disposed for indexing engagement with a spring pressed indexing ball or detent 47, disposed in the casing 48 fixed on the supporting plate 25.

A brake disk supporting spider 49 is provided with a hub portion 50 indexed on the disk 45 by a pin or dowel 51 and includes arms 49ᵃ each carrying a brake disk and liner locating element 51 having an upstanding locator pin 52 and positioning lug 53.

The brake disk or plate 31, as shown in Figure 2, is conventional and is formed with apertures 54 having definite predetermined locations to the predetermined locations of the rivet holes 30 in predetermined groups for the rivets 36, securing the brake lining 72 to the disk 31.

The group of punches 22 are also located, with reference to the center of the brake disks and linings, represented by the center of the spindle 44, and the radial and circumferential spacing of the rivet holes to dispose the centers of the punch guide bushings 23 approximately in alignment with the centers of the rivet receiving openings 30 in the brake disks when a brake disk is disposed in position and properly indexed by the pins 52. Also the reduced ends of the guide bushings are only slightly smaller than the diameter of the rivet head receiving openings 30 in the brake disk 31, or the brake lining 32, as the case may be, so that in the event of any slight misalignment of any one or more of the rivet receiving openings 30 when the striker plate 10 is depressed by the punch press head 3 the beveled nose portions 29ᵃ at the outer extremities of the lower ends 29 of the punch guide bushings will engage the openings 30 in the brake disks or linings for the rivet heads and will shift the guide bushings and punches to position the punches 35 in proper alignment with the shank portions of the rivets.

In the operation of the device, the brake disk 31 is placed on the spider 49 in supporting contact on the liner locating elements 51, with the pins 52 disposed in complemental openings in the brake disk. This disposes the brake disk and lining in predetermined position on the lower pedestal liner supporting plate 4ᵃ which has openings 4ᶜ for receiving the punched-out rivets. The indexing means 46—48 disposes the group of rivets to be punched out under the group of adjustable punch guide bushing means 23, the spring means 8 maintaining the rivet punching head elevated for proper clearance above the brake disk, the stripper spring means 17 maintaining the punch means 35 withdrawn into the punch guide bushing means 23 as seen in Figure 4.

As the punching head 3 is forced downwardly the punching device is also forced downwardly, the beveled lower ends 29ª entering the openings 30 and centering the punch members 35 over the centers of the rivets 36. When the lower ends 29 of the bushings strike the rivet heads, exerting resilient clamping pressure on the brake disk against the lower pedestal support plate 4ª, continued downward movement of the striker plate 10 forces the punches through the heads of the rivets to punch the rivets from the brake disk and liner, the punched-out rivets falling through the openings 40.

Withdrawal or upward movement of the punch press head 3 first withdraws or strips the punches from the rivet holes in the brake disks, due to the resilient pressure of the stripper springs 17 on the stripper plate 15 containing the punch guide bushings 23. This continues until the heads 14 of the stripper bolts 12 engage the top of the punch guide plate 6ª at which time the punches are withdrawn into the punch guide bushings 23, as seen on Figure 4.

Continued retraction of the punch press head 3 permits the lifting springs 8 to raise the punching device, withdrawing the extremities 29 of the guide bushings 23 out of the group of rivet head receiving openings 30 in the brake disk 31. The spider 49 can now be rotated and indexed to dispose the next group of rivets in position under the respective punches and the procedure repeated until all of the rivets retaining the liner to the brake disk are punched out, separating the linears from the brake disk. Should any slight misalignment occur during the punching-out operation the beveled ends 29ª of the guide bushings will shift the guide bushings and the punches carried therein into proper alignment to prevent damage to the ends 29 of the guide bushings or injury to the rivet receiving openings in the brake disks or liners.

Removal of the striker plates 42 permit the punches 22 to be removed for replacement, and removal of the retainer means or screws 28 permits the removal of the guide bushings 23 for replacement.

While the rivet punching device shown and described herein is fully capable of achieving the objects and providing the advantages hereinbefore stated, it will be realized that it is capable of modification by those skilled in the art. Therefore I do not mean to be limited to the form shown and described herein but rather to the scope of the appended claims.

I claim:

1. A disk brake rivet punch for use with a punch press having a punching head and a supporting pedestal, a base plate adapted to rest on the pedestal, a brake disk supporting spider rotatably carried by said base plate, means between said spider and said base plate for indexing said spider in predetermined rotative positions above said base plate, indexing means on said spider for indexing on said spider a flat circular brake disk having a flat circular brake lining riveted thereon, in predetermined rotative positions under said punching head, a punch retainer plate, a plurality of adjustable punches carried by said punch retainer plate for independent lateral shifting adjustment in any direction with their centers adapted to be disposed in a predetermined grouping arrangement substantially over the centers of rivets in predetermined groups of the rivets in the brake disk when the brake disk is disposed on the spider and indexed by said indexing means, means between said base plate and said punch retainer plate adapted to yieldably exert punch withdrawal pressure on said punch retainer plate toward the punching head of the punch press, a punch guide bushing supporting plate mounted on said punch retainer plate for limited movement toward and away from said punch retainer plate, a punch guide bushing for each of said rivet punches, adjustably carried by said punch guide bushing supporting plate for limited lateral shifting adjustment in any direction with its rivet punch, relative to said guide bushing supporting plate, said punch guide bushing having lower end portions normally surrounding the lower ends of the rivet punches having a size to fit the rivet receiving recesses in the brake disks and linings when indexed on said spider with the outer extremities of the said lower ends adapted to contact with the heads of the rivets in the disks and linings, with the punching ends of the rivet punches substantially flush with the lower ends of the punch guide bushings, said lower ends of said guide bushings each having an annular downwardly and inwardly beveled outer end for centering the punch guide bushing's lower end into the rivet receiving recesses of the brake disks and liners to center the rivet punches over the centers of the rivets in the brake disks and liners, said rivet punches each having an outer punch end portion slidable through the punch guide bushing having a diameter not exceeding the diameter of the shanks of the rivets in the brake disk when indexed on said spider securing the lining thereto, and resilient means between the guide bushing supporting plate and the punch retainer plate for urging the guide bushing supporting plate away from the punch retainer plate to retract the said lower end portion of said rivet punches into the guide bushings to strip the rivet punches from the brake disk when the punch retainer plate is retracted by said retracting means.

2. A disk brake rivet removing punch device comprising a base plate, a brake disk supporting spider rotatably carried by said base plate, indexing means between said plate and spider for indexing the rotative position of said spider on said plate, indexing means on said spider for centering a flat brake disk on said spider and indexing the disk about its center to dispose predetermined groups of rivet receiving openings in the brake disk in predetermined position over said base plate, a vertically movable rivet punch retainer plate disposed above said base plate, spring means between said base plate and said punch retainer plate for yieldably supporting said punch retainer plate in elevated position over said base plate, guide means between said base plate and said punch retainer plate for guiding said punch retainer plate in parallel relation to said base plate toward and away from said base plate, a group of rivet punches adjustably secured to said punch retainer plate normal thereto for lateral adjustment in any direction relative to said base plate, said punches disposed in said retainer plate with their centers disposed in predetermined substantially identical positions to the centers of the axes of the rivets of the groups of the rivets in the brake disk securing the linings thereto when the brake disk is disposed on said base plate in said indexed position, a rivet punch guide bushing supporting plate disposed intermediate said punch retainer plate and said base plate in spaced parallel relation to said punch retainer plate, guide means between said punch retainer plate and said guide bushing supporting plate for guiding said bushing supporting plate toward and away from said punch retainer plate including stop means for limiting the movement of said bushing supporting plate away from said punch retainer plate, resilient means between said punch retainer plate and said guide bushing supporting plate yieldably urging said guide bushing supporting plate toward said stop means, a plurality of punch guide bushings mounted in said guide bushing supporting plate for lateral adjustment in any direction, said guide bushings each having one of said adjustable rivet punches reciprocatable centrally therethrough, said punch guide bushings each having a lower cylindrical extension shaped to fit a rivet head receiving opening in the brake disk liner with the end of the extension engaging the head of a liner retaining rivet to center said rivet punches over the centers of the shanks of the rivets, said rivet punches each having a lower punching end having a diameter substantially equal to but not greater than the diameter of the shanks of the rivets in the liner and brake disk, said resilient means constituting stripper means between said guide bushing supporting plate and said punch retainer plate for withdrawing said punches in said guide bushing to strip said punches from said rivet heads as the punch retainer plate is elevated to withdraw said punches from said rivets and the rivet head receiving openings in the brake disks when the punch retainer plate is retracted by said spring means.

3. A rivet removing punch device as set forth in claim 2 in which said guide bushings are each provided with an annular inwardly and downwardly beveled extremity on the end of said lower cylindrical extenson of said guide bushing for engagement with the outer edge of the rivet openings in the brake disk liners to shift said guide bushings and said punches laterally in any direction into centralized relation with the rivet openings when said punches are depressed thereinto, when any of the punches and guide means are disposed out of alignment with the centers of the rivet openings.

4. A rivet punching device for punching a group of recessed headed rivets from a flat brake disk and brake linings riveted thereto comprising, an upper rivet punch retainer plate, a plurality of rivet punches adjustably connected to said retainer plate in substantially predetermined spaced positions in a group corresponding substantially in location to the centers of the rivets in the brake disk, said punches disposed for limited lateral shifting movement in any direction from said predetermined positions, a bushing supporting plate disposed below said punch retainer plate in spaced parallel relation to said punch retainer plate, guide means between said punch retainer plate and said guide bushing supporting plate for guiding said guide bushing supporting plate toward and away from said punch retainer plate, stop means on said guide means for limiting relative downward movement of said bushing supporting plate away from said punch retainer plate, spring means between said punch retainer plate and said guide bushing plate yieldably forcing said bushing retainer plate away from said punch retainer plate into movement limiting engagement with said stop means, said rivet punches each having a head laterally adjustable in said punch retainer plate in any direction formed with a reduced diameter cylindrical rivet punch lower extremity, a plurality of rivet stripper guide bushings adjustably carried by said guide bushing supporting plate for independent lateral shifting movement in any direction having lower stripping extremities disposed in substantially vertically aligned similar axial relation to said predetermined positions to the centers of the rivets of said group, said stripping extremities formed to fit the rivet head openings in the brake disks and seat on the rivet heads in a brake disk when the upper rivet punch retainer plate is moved downwardly toward a brake disk disposed below said guide bushings with the rivet openings in substantial alignment with said rivet punch lower extremities, said guide bushings each having a rivet punch guide opening therethrough to receive said punch extremities and permit the punch extremities to be projected beyond the ends of said stripper guide bushing extremities, said punch extremities having a punching end conforming substantially in cross section to the cross section of the shanks of the rivets in the brake disk below the heads thereof whereby said bushing retainer plate mounting for said guide bushings permits lateral adjustment in any direction of said rivet punches, into alignment with any rivet head opening which may be slightly out of said predetermined position in a group of rivets to be punched out of brake disk.

5. A device as claimed in claim 4 in which each of said stripping extremities is beveled inwardly and downwardly to provide guiding means for centralizing the stripping extremities and the punches as they enter the rivet head openings in the brake disks to center the punch extremities over the centers of the shanks of the rivets in the brake disks.

6. A rivet punching device for simultaneously punching a predetermined spaced group of rivets from a brake disk in a conventional punch press having a horizontal supporting pedestal and a press head vertically movable toward and away from the pedestal, said device comprising, a brake disk supporting means adapted to be supported horizontally on said pedestal, vertical guide means extending upwardly from said supporting means, a top plate vertically movable on said guide means parallel to said supporting means, a group of rivet punches adjustably carried by said top plate in substantially predetermined spaced positions in a group corresponding to the predetermined locations of the rivets of the group in the brake disk to dispose the centers of the punches of the group substantially in alignment with the centers of the rivets in the group in the brake disk, a striker plate secured to said top plate for engaging the upper ends of said rivet punches to move the same downwardly during the rivet punching operation, a stripper plate vertically movable relative to said top plate in parallel relation to and below said top plate, a plurality of rivet stripper punch guide bushings adjustably carried by said stripper plate, each having a downwardly and inwardly beveled lower end and a central punch guide passage therethrough receiving the lower end and punching extremity of one of said rivet punches, said punches and said stripper guide bushing being respectively secured in said top plate and said stripper plate for limited lateral shifting displacement in any direction about the axes of said predetermined spaced positions above said brake disk supporting means, identical to the centers of the rivet receiving openings in the brake disk, spring means for moving said top plate upwardly away from said brake disk supporting means, stripper spring means between said top and stripper plate for yieldably moving said stripper plate relatively downward away from said top plate to withdraw said punches into said guide bushings, stop means between said top plate and said stripper plate for limiting relative downward movement of said stripper plate away from said top plate during upward movement of said top plate.

7. A device as set forth in claim 6 in which said punch guide bushings each have a reduced size cylindrical stripper extremity extending upwardly from said beveled lower end for entering the rivet head receiving opening in the brake disk, and said rivet punches are each formed with a reduced elongated cylindrical punch extremity at its lower end slidably guided centrally in said guide bushing guide passage and dimensioned substantially equal to but not greater in cross section than the shanks of the rivets to be punched out of the brake disk.

References Cited in the file of this patent

UNITED STATES PATENTS

| | | |
|---|---|---|
| 629,429 | Corscaden | July 25, 1899 |
| 1,691,928 | Hutchinson et al. | Nov. 20, 1928 |
| 2,594,901 | Forster | Apr. 29, 1952 |
| 2,744,577 | Paxhia et al. | May 8, 1956 |
| 2,839,306 | Bayless | June 17, 1958 |